United States Patent [19]

Berman et al.

[11] 3,899,333

[45] Aug. 12, 1975

[54] PHOTOSENSITIVE COMPOSITION CONTAINING TiO₂ HAVING A PARTICLE SIZE OF ABOUT 25 MILLIMICRONS AND THE USE THEREOF IN PHYSICAL DEVELOPMENT

[75] Inventors: Elliot Berman, Braintree; Carl F. W. Ekman, Bedford, both of Mass.

[73] Assignee: Itek Corporation, Lexington, Mass.

[22] Filed: Feb. 27, 1973

[21] Appl. No.: 336,389

Related U.S. Application Data

[63] Continuation of Ser. No. 432,887, Feb. 15, 1965, abandoned, and a continuation-in-part of Ser. No. 360,094, April 15, 1964, abandoned.

[52] U.S. Cl. .................. 96/48 PD; 96/88; 96/1.5; 96/1.8; 106/300; 252/501
[51] Int. Cl. ......................... G03c 5/24; G03c 1/00
[58] Field of Search ............ 96/48 PD, 1.5, 1.8, 88, 96/50 R; 252/501; 106/300

[56] References Cited

UNITED STATES PATENTS

| | | | |
|---|---|---|---|
| 2,886,434 | 5/1959 | Owens | 96/1.5 |
| 3,197,307 | 7/1965 | Blake et al. | 96/1.8 |
| 3,198,632 | 8/1965 | Kimble et al. | 96/1.8 |
| 3,214,284 | 10/1965 | Wilson | 106/300 |
| 3,360,341 | 12/1967 | Tillmann et al. | 106/300 |

*Primary Examiner*—Won H. Louie, Jr.
*Attorney, Agent, or Firm*—Homer O. Blair; Robert L. Nathans; W. Gary Goodson

[57] ABSTRACT

An improvement is disclosed in a data storage medium comprising a substrate having a radiation sensitive coating thereon consisting essentially of particulate titanium dioxide dispersed in a binder and developable after exposure by a physical developer. The specific improvement comprises the use of a particulate titanium dioxide having an average particle size of about 25 millimicrons.

13 Claims, No Drawings

PHOTOSENSITIVE COMPOSITION CONTAINING TIO₂ HAVING A PARTICLE SIZE OF ABOUT 25 MILLIMICRONS AND THE USE THEREOF IN PHYSICAL DEVELOPMENT

This is a continuation of application Ser. No. 432,887, filed Feb. 15, 1965, now abandoned, and a continuation in part of U.S. Pat. application Ser. No. 360,094, filed Apr. 15, 1964 now abandoned. More precisely, this invention relates to data storage media of the type comprising a substrate having a radiation sensitive coating thereon. An especially preferred embodiment of the present invention relates to media of the type described comprising transparent or translucent substrates.

Commonly owned copending application Ser. No. 199,211, filed May 14, 1962, now abandoned by Elliot Berman et al. discloses data storage systems involving the irradiation of data storage media comprising photoconductor materials with an image pattern of activating radiation. This exposure renders the materials chemically reactive in a pattern corresponding to the image pattern of radiation. Said image pattern is reversible and can be stored in the activated portion of said media and subsequently erased therefrom or alternatively can be converted to an irreversible image pattern by contacting said chemically reactive portions with a chemical redox system. The irreversible image so obtained may be visible or latent; if latent, said image is developed to a visible image by intensification techniques.

For example, Application Ser. No. 199,211 discloses the use, as a copy medium in the systems there described, of substrate materials coated with a dispersion of finely divided titanium dioixide in an adhesive binder. After exposure to activating radiation, a reversible image pattern can be converted to an irreversible image pattern by contacting at least the irradiated portion of said medium with a chemical redox system capable of reacting on contact with said portions to form an image conforming to said image pattern. Suitable redox systems which can convert said reversible pattern to an irreversible image pattern include oxidizing agents which are reduced at least as easily as ionic copper. For example, the redox system may contain a metal ion, such as silver ion, precipitating free metal on the exposed medium on contact with chemically reactive portions thereof. Thus a visible image of the image pattern of radiation is formed in the copy medium by the deposition of free metal when such a developing system is used.

It has now been found that copy media of the type described can be improved by including a finely divided titanium dioxide of unusually small particle size therein as the radiation sensitive component of the media. More precisely, we have discovered that the overall quality of images obtained in said medias can be improved in a surprisingly unexpected fashion when the radiation sensitive component of said media is a titanium dioxide having an average particle size no greater than about 250 millimicrons. In the most preferred embodiment of our invention, titanium dioxides having an average particle size between about 25 to about 100 millimicrons are especially advantageous. By "average particle size" we mean a mixture of particles in which the normal number average distribution of particle sizes has a maximum at no greater than about the particle size recited, although decreasingly small numbers of larger particles or of smaller particles may be present.

Another special advantage observed in using titanium dioxide of the above mentioned particle size is that layers containing same can be coated on transparent or translucent substrates to produce media having optical properties such that the developed sheet is transmissive of visible light, i.e. is suitable for projection viewing. It is to be understood that said pellucid media, that is to say, media which are either transparent or translucent, constitute the most preferred embodiment of the present invention.

The physical properties of the finely divided titanium dioxide described above differ considerably from those of pigment sized titanium dioxide which the art generally understands to mean titanium dioxides having an average particle size greater than 250 millimicrons and generally above 300 millimicrons. The finely divided titanium dioxide of the present invention is preferably produced by processes involving the pyrolysis of titanium tetrachloride. Similar processes are used for the production of very finely divided silicon dioxide. Both of these materials are used in the art as anticaking agents, but the greater cost of titanium dioxide has subordinated the product to silicon dioxide in the same form.

A coated data storage medium according to the present invention is suitably prepared by dispersing a finely divided titanium dioxide having the average particle size mentioned earlier in a suspending liquid, aqueous or non-aqueous, optionally in the presence of a dispersing agent. The dispersing agent is not critical, and may be ionic or non-ionic, organic or inorganic. Normally, phosphates, such as trisodium phosphate, are employed as dispersants in aqueous systems because of their low cost and easy availability. After thorough dispersion of the finely-divided solid in a liquid dispersant, the dispersion is combined with an adhesive binder. The latter is also suitably dispersed as in an emulsion or solution, for ease in homogenizing the resulting mixtures.

As adhesive binders, the natural or synthetic materials heretofore known in the art as binders in media of this type can be employed. The preferred binders are those organic resins which are transparent or translucent when cured such as a copolymer of butadiene and styrene more commonly known as "Pliolite" and polyamide more commonly known as "Zytel 61". Other suitable binder materials include polyvinyl alcohol, polyvinyl acetate, polyvinyl chloride. polyvinylidene chloride, or ½-second cellulose acetatebutyrate, starch and gelatin.

The ratio of finely divided TiO₂ to binder in the coatings may vary between from eight parts to one part by weight of TiO₂ to one part by weight of binder solids or from one part by weight TiO₂ to four parts by weight of binder solids.

The thickness of coatings containing the TiO₂ of the present invention is a factor which can somewhat affect the degree of transmissiveness of said coatings. Accordingly, the thickness of the coatings of our pellucid media should generally not exceed about 50 mils but especially preferred coatings are those of a thickness less than about 10 mils. Also the coating weight of said media can vary over a wide range but in general coating weights of less than about 20 pounds per 3000 feet are definitely preferred.

The binder having solids dispersed therein can be coated onto a suitable substrate by conventional coating methods, such as dipping, flowing use of a doctor blade, etc. The substrate material is preferably flexible but rigid substrates such as glass, and the like may be used if desired. As stated, the most preferred substrates are transparent or translucent and such include polyethylene terephthalate more commonly known as "Mylar", polyesters such as those known as "Scothchpar", celluslose acetate and the like.

We have found that various dyes can be advantageously included in the compositions of the present invention. For example, many organic dyes can alter the spectral response of the titanium dioxide to extend the range of photosensitivity thereof from the ultra-violet to the visible or to other regions of the spectrum in which the dyes can absorb radiation. The most useful dyes are those known to the art broadly as cyanine dyes including derivatives of cyanine dyes such as those known as carbocyanine, merocyanine and hemicyanine dyes.

Broadly, cyanine dyes and their derivatives are defined as dyes which contains two or more ring structures at least one of which contains a nitrogen atom with said rings being joined by a structure containing at least one unsaturated site. Helpful details pertaining to cyanine dyes which are suitable in the practice of the present invention can be found in pages 371 to 429 in "The Theory of Photographic Process" by C. E. Kenneth Mees published by MacMillain Company in 1952.

Other useful dyes include those known to the art as triphenylmethane dyes such as Crystal Violet and Basic Fuchsin, diphenylmethane dyes such as Auramine O, and Xanthene dyes such as Rhodamine B.

Said sensitizing dyes can be combined with the titanium dioxide in many convenient manners. For example, said dyes can be dissolved in a suitable organic solvent, e.g., methanol, ethanol, acetone and the like and said solution can be added to an aqueous pigment dispersion. After thorough mixing, the sensitized dispersion can be coated on a suitable substrate and dired in the usual manner. Also unsensitized media comprising a substrate and coating can be immersed, in the dark, in a solution of the dye. Usually the concentration of the dye in the solution need be no greater than 5 to 10 milligrams of dye per 100 milliliters of solvent.

Also, the spectral response of the titanium dioxide used in our compositions can be altered by doping with foreign ions. Accordingly, minor amounts of foreign ions of such metals as iron, cobalt, nickel, tungsten, tantalum and mixtures of these can be included in the photosensitive media of the present invention. In general, the most useful amounts of said ions range from about 0.01% to about 5% by weight of the solid and ion with amounts somewhat higher often time being included if desired.

A better understanding of manners of producing data storage mediums in accordance with the practice of our invention will be had by referring to the following examples given by way of illustration

EXAMPLE 1

Sixteen parts by weight of finely divided "Cabot P25" titanium dioxide having an average particle size of about 25 millimicrons was dispersed in about 75 parts by wegiht of water in which 0.32 part by weight of sodium hexametaphosphate had been added as a dispersing agent. The pigment was added with stirring, and the mixture was thoroughly agitated to disperse the titanium dioxide uniformly therethrough.

About 8.5 parts by weight of 47% "Rhoplex" aqueous polyacrylate latex were next combined with the dispersion containing the titanium dioxide particles. The mixture, which was thoroughly stirred, thus contained about 4 parts of acrylate solids by dry weight so that the weight ratio of $TiO_2$ to binder solids was 4 to 1. The resulting mixture was coated on single weight baryta paper of photographic grade and dired at room temperatures. The coating weight of said photosensitive media was six pound per 3000 square feet. Higher coating weights or coating weights as little as 3 pound per 3000 square feet can also be used in the present invention.

A pellucid data storage medium can be obtained in accordance with the procedure described above by coating said mixture of titanium dioxide and binder on a "Mylar" support.

EXAMPLE 2

About 10.4 parts by weight of a finely divided titanium dioxide having an average particle size of about 100 millimicrons was dispersed with suitable agitation in about 100 parts by weight of deionized water which contained about 0.2 parts by weight of sodium oxalate as a dispersing agent. About 45 parts by weight of a polyacrylate resin emulsion were then added to said titanium dioxide dispersion and the mixture was thoroughly stirred. Said mixture was then coated about 4 mils thick on a polyester film and thereafter said coated film was heated at a temperature of about 250°F. till the resin binder was cured. The resulting data storage medium was transmissive of visible light.

EXAMPLE 3

Substantially the same procedure as in Example 2 was followed but a solution of an organic dye sensitizer was added to the titanium dioxide dispersion prior to the addition of the binder to said dispersion. They dye solution contained about 0.1 part by weight of 2-p-dimethyl aminostyrl-4-methyl thiazoyl heptyl dioxide in 10 parts by weight methanol. Quality images were developed in the pellucid medium after exposure thereof to a light source having a wave length above about 420 millimicrons.

EXAMPLE 4

Substantially the same procedure of Example 1 was followed but the Cabot P25 was doped with 0.1% by weight cobalt prior to the dispersion of said Cabot P25. Quality images were developed in the medium after exposure thereof to a light source having a wave length above about 420 millimicrons.

Many modifications of incidental features involved in the above Examples offered for the purposes of illustrating our invention are included within the spirit and scope of the invention defined in the appended claims.

Having disclosed our invention together with preferred embodiments thereof what we declare as new and desire to secure by U.S. Letters Patents is claimed as follows:

1. In a data storage medium comprising a substrate and a radiation sensitive coating thereon, said coating consisting essentially of particulate titanium dioxide dispersed in a binder, said medium being suitable for use in a process wherein said medium is exposed imagewise and contacted with a physical developer comprising a solution of metal ions and a reducing agent for said metal ions to produce a visible image in said medium, the improvement wherein said particulate titanium dioxide has an average particle size of about 25 millimicrons.

2. Improvement as in claim 1 wherein said substrate is transmissive of visible light.

3. Improvement as in claim 1 wherein said medium includes a dye sensitizer.

4. Improvement as in claim 1 wherein said metal ions are silver ions.

5. Improvement as in claim 1 wherein said coating was formed by applying an aqueous dispersion of titanium dioxide to said substrate, said aqueous dispersion comprising an aqueous suspending liquid, said particulate titanium dioxide, a dispersing agent and an organic binder.

6. A pellucid data storage medium suitable for projection viewing after development of an image therein by means of contacting the imagewise exposed medium with a redox developer composition comprising a solution of metals ions, said medium comprising a light transmissive substrate and a radiation sensitive coating thereon said coating being no more than about 10 mils thick and consisting essentially of a binder and dispersed therein, a particles of titanium dioxide having an average particle size less than 100 millimicrons, the ratio of said solid binder being from about 8 parts by weight of titanium dioxide to 1 part by weight binder solids to about 1 part by weight titanium dioxide to about 4 parts by weight binder solids and the coating weight being less than about 20 pounds of coating per 3,000 square feet of substrate, the improvement wherein said titanium dioxide has an average particle size of of about 25 millimicrons.

7. Medium as in claim 6 wherein the titanium dioxide is produced by pyrolosis of titanium tetrachloride.

8. In a process of recording an image pattern of activating radiation by imagewise exposing and contacting with a physical developer comprising a solution of metal ions and a reducing agent for said metal ions a data storage medium comprising titanium dioxide, the improvement wherein the titanium dioxide has an average particle size of about 25 millimicrons.

9. Improvement as in claim 8 wherein said metal ions are silver ions.

10. Improvement as in claim 8 wherein said titanium dioxide is dispersed in an organic binder.

11. Improvement as in claim 8 wherein said data storage medium is formed by coating a substrate with an aqueous dispersion comprising an aqueous suspending liquid, said titanium dioxide, a dispersing agent, and an organic binder.

12. In a process of recording an image pattern of actinic light by exposing to an image pattern of actinic light a data storage medium comprising a particulate titanium dioxide in an organic binder which titanium dioxide becomes reversibly activated by such exposure and thereby capable of causing chemical reactions at portions of said medium corresponding to said image pattern of actinic light and then applying to at least reversibly activated portions of said medium a physcial developer comprising a solution of metal ions and a reducing agent for said metal ions which forms metal images solely on contact with at least activated portions of said data storage medium, the improvement wherein the titanium dioxide has an average particle size of about 25 millimicrons.

13. Improvement as in claim 12 wherein said metal ions are silver ions.

* * * * *